United States Patent [19]

Dara-Abrams

[11] Patent Number: 4,900,256
[45] Date of Patent: Feb. 13, 1990

[54] OBJECT-DIRECTED EMOTIONAL RESOLUTION APPARATUS AND METHOD

[76] Inventor: Benay P. Dara-Abrams, 961 Andover Way, Los Altos, Calif. 94022

[21] Appl. No.: 296,479

[22] Filed: Jan. 12, 1989

[51] Int. Cl.$^4$ .............................................. G09B 19/00
[52] U.S. Cl. .................................... 434/236; 434/308; 446/397
[58] Field of Search ............... 434/236, 237, 308, 309; 446/397

[56] References Cited

U.S. PATENT DOCUMENTS

| | | | |
|---|---|---|---|
| 3,376,585 | 4/1968 | Muzaurieta | 5/462 |
| 3,383,074 | 5/1968 | Coplin | 244/55 |
| 3,636,654 | 1/1972 | Workman | 446/408 |
| 3,934,284 | 1/1976 | Paletta et al. | 5/280 |
| 3,949,488 | 4/1976 | Welch | 434/308 X |
| 4,318,245 | 3/1982 | Stowell et al. | 446/303 |
| 4,411,629 | 10/1983 | Voights | 446/302 X |
| 4,651,613 | 3/1987 | Harrison | 446/297 X |
| 4,710,145 | 12/1987 | Hall Vandis | 434/236 X |

*Primary Examiner*—William H. Grieb
*Attorney, Agent, or Firm*—Townsend and Townsend

[57] ABSTRACT

An object-directed emotional resolution apparatus and method. The apparatus uses speech and electronics technology coupled with psychological techniques to further emotional development and stress reduction. The preferred embodiment of the apparatus for children aged two to six is comprised of a shell-like body having projections around the outer periphery thereof, each projection and the body being formed of a flexible fabric material wherein the projections can be selectively grasped, struck or touched to actuate switches in respective projections. An electronic, speech playback device having electronic circuitry providing a number of different scripts is carried by the body, each script corresponding to a predetermined psychological exercise which can be selected by the user by striking, squeezing or touching a respective projection and the switch in the projection. After actuating the electronic device, the user can follow the instructions set forth on the selected script. The body can be changed from a first configuration in which the projections are on the outer surface of the body to a second configuration in which the projections are within the body. In the second configuration, pillow-like members can be made to extend outwardly from the body to simulate clouds along with a colorful outer surface on the body to provide a rainbow effect. The object-directed emotional resolution method is used in other embodiments of the apparatus for use by persons of other age groups.

22 Claims, 5 Drawing Sheets

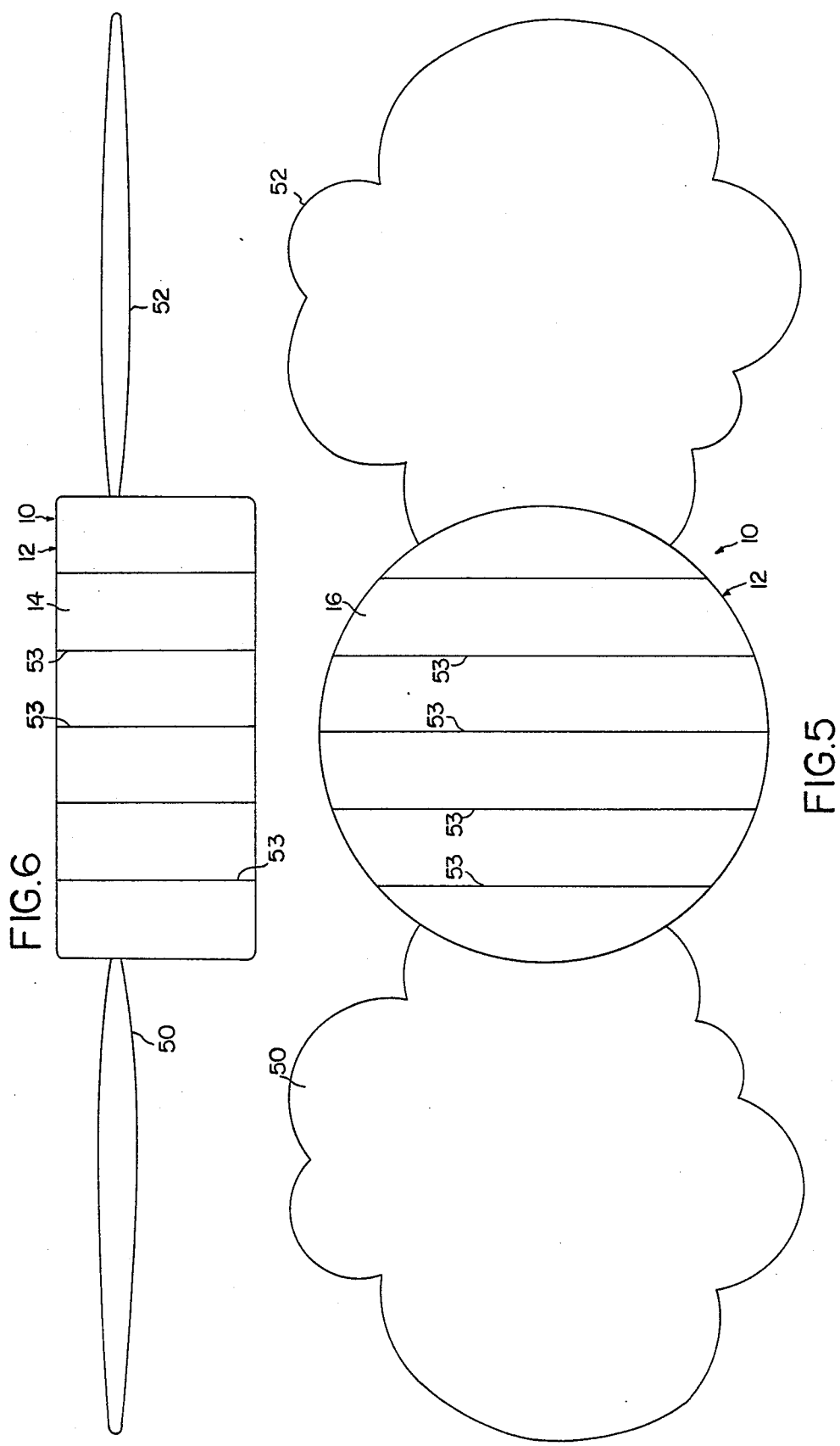

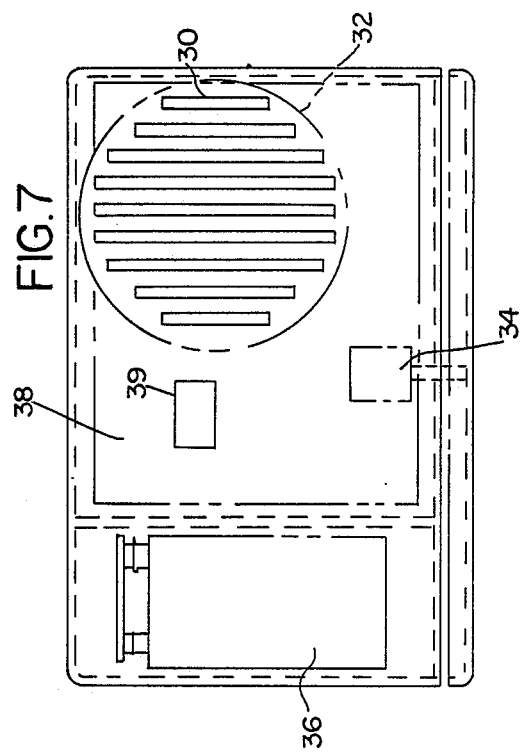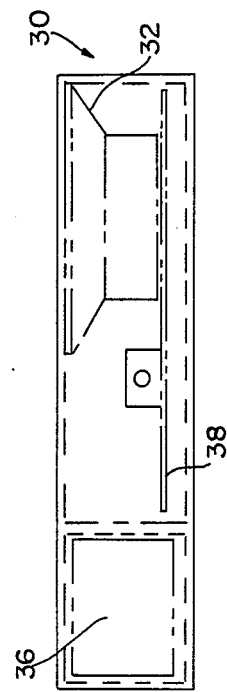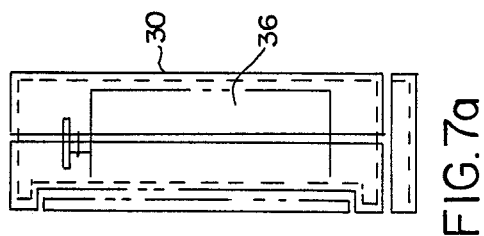

OBJECT-DIRECTED EMOTIONAL RESOLUTION APPARATUS AND METHOD

The present invention relates to apparatus and method usable for applying psychological development techniques and stress reduction techniques that are used to assist children, preteens, teenagers and adults in resolving emotional conflicts and relieving tension.

The apparatus and method is used by selecting programmed psychological exercises by manipulating actuating devices in the apparatus, listening to programmed exercises, and carrying out specified activities in the anner directed by instructions and sound effects provided by the apparatus.

BACKGROUND OF THE INVENTION

The method of the present invention is a series of object-directed, emotional resolution steps comprised of a synthesis of psychological techniques and speech technology. The psychological techniques used in the method are based on the findings of several schools of psychological thought, including Jean Piaget's child development theories[1] (see Appendix A), Carl Rogers' client-centered therapy[2], B. F. Skinner's behavioral theories[3], and Dr. George Bach's Creative Aggression techniques[4] as well as on recent findings on the therapeutic effects of laughter[5], biofeedback and stress reduction techniques[6]. The method of defusing emotions and stress through physical actions is supported by Bach's and other clinical psychologists' and psychotherapists' use of devices to hit with. However, the object-directed emotional resolution method directs the person's anger at a neutral object, not at a person[7]. The acceptance of various feelings, including anger, loneliness, and tension is prominent in clinical psychology particularly in such theories as Eric Berne's Transactional Analysis[8], Virginia Satir's family therapy and model of self-esteem[9], and Carl Rogers' client-centered therapy.

The object-directed emotional resolution method engages the "free child" described by transactional analysts, which helps break the aggravation/anger/stress cycle in children and adults alike. The behavior modification techniques pioneered by B. F. Skinner support the idea that people can change the way they handle stress. In response to tension (the stimulus), people can learn to relax through the use of the object-directed emotional resolution method, thereby changing their long-term response to stress-inducing situations. The child development theories of Jean Piaget explain the intellectual, emotional and moral development of children. Piaget's work supports the use of concrete objects and concrete interactions with those objects (e.g. speech and sound effects) in the object-directed emotional resolution method as an effective way for children to learn to deal with their feelings.

The apparatus of the present invention is usable for emotional resolution for preschool age children (2–6 years old) and incorporates speech technology, soft goods design, and developmental psychology. The theories and practices of child rearing, developmental psychology, and clinical psychology provide the basis for the design and use of the object-directed emotional resolution apparatus which is designed specifically to help preschoolers resolve angry feelings.

Regarding the nature of preschooler's cognitive and moral development, Damon[10], Gross and Wojnilower[11], Honig[12], Piaget[13], and Turiel[14] felt that preschoolers are in the beginning stages of perspective-taking. They can't usually generate this on their own, but with help can sometimes accomplish perspective-taking. They are also beginning to understand consequences as a result of their actions (causal relations). Therefore, the scripts explain and further this understanding.

According to Cahill[15], the nature of anger in the preschooler is an attempt at mastery. The child's attitude should be that anger is okay, and that he can control his emotions and sometimes even the circumstances that give rise to these emotions. Increased mastery will lead to decreased anger in the child at this age. The scripts accept the child's anger via an accepting tone of voice and via the choice of words which relate to the child's anger. The words in the song allow the child several ways to fantasize dealing with his anger, and the underlying assumption in each of the strategies is that the child can do something with those "grouchy angries".

Axline[16] and Boswell[17] recommend a multimodal approach to dealing with anger as the most effective technique. The multimodal approach includes role-playing, self-talking ("Tell me what's wrong"), fantasy, physical release of aggression (pounding, jumping, etc.), physical relaxation (deep breathing), and diversion (singing, fantasy, etc.). The scripts are an embodiment of this approach.

In McCandless and Trotter's research[18], the most effective techniques to deal with anger were found to be: diversion, physical release, self-talk, and fantasy. The strategies were designed to incorporate these techniques.

Schaeffer and Millman[19] and others highly recommend self-talk. The technique of client-centered therapy, pioneered by Carl Rogers, involves allowing the person to talk about whatever is bothering him. There is an exercise which asks the child to tell the apparatus of the present invention what he is angry about. The apparatus is designed to be approachable and receptive so that the child will feel comfortable talking to the apparatus. The soft goods design is intentionally comforting and interesting to a preschooler so that the apparatus is felt to be approachable. The voice and the words in the self-talk exercise have been chosen to signal acceptance so that the child will feel comfortable pouring out his angry feelings to the apparatus. The voice of a trained psychologist can be used in the recording of the script so that the child would feel the "unconditional positive regard" considered important to relating his angry feelings.

To insure autonomy, self-talk (recommended by Kopp[20], deciding when the session is finished (following Miller's[21] advice on children ending their own time-out sessions), and being allowed to choose which exercises to listen to, are designed-in features of the recorded scripts and apparatus.

Attention span is limited in preschoolers. Two-and-one-half minutes is the lowest attention span estimate (according to Jones'[22] data) for the youngest children targeted. Jones and others also recommend not overloading children with information in individual exercises. Therefore, each exercise of the present invention is designed to be fairly simple with enough to interest the child but not overload him with information. Each of the exercises is approximately one minute of speech so that the child will stay interested and may choose one or more exercises. In practice, time-outs of two minutes for two and three year olds and three minutes for four to six year olds are usually sufficient for children to calm down. Therefore, the scripts of the present invention were designed for children to be able to enjoy and relate to one or more exercises in the period of time sufficient to calm them down but not so long that they will become bored, overloaded or restless.

Nevertheless, Oppenheim[23] and Schaeffer and Millman felt that preschoolers require assistance to devise strategies to work out anger on their own. Following directions facilitates children's development of self-control. Therefore, each exercise directs and guides the child to use certain strategies to work out his anger. These are strategies he may then use on his own.

Dobson[24] confirmed the inventor's belief that it is important to restrict adult intervention. Too much adult intervention discourages the transfer of responsibility to the child and the ensuing feeling of self-sufficiency. The idea of the apparatus is to allow the child to do something about his feelings without requiring adult intervention.

The singing script recorded in the apparatus of the present invention was designed as an effective tool to deal with anger. McCandless and Trotter support the diversion of the child's attention as effective in both the short and long-term. The words of the song of the script include fantasy, role-playing, and incongruity humor, which are appreciated by preschoolers and are very helpful in dealing with anger. Specifically, singing can be a memory aid, and the funny images in the song are likely to be remembered with laughter by many preschoolers as well as their parents and teachers. Sometimes, laughter can lighten the mood which prevails when a child is angry, and both parents and children can deal with their emotions more effectively. Laughter is now recognized as an effective stress reduction technique for adults as well.

Axline, Boswell and Briggs[25] all supported the idea that it would be beneficial to include some concrete conversion. The literature suggested that it would be very beneficial to make the conversion from anger state to non-anger state as concrete as possible. It would help in signaling that the episode is finished, that positive things can come from anger, and that the child is in control of, and owns his emotions.

The apparatus of the present invention was, therefore, designed to turn from an "angry pounding pillow" into a multi-colored "satiny" rainbow with soft clouds. At the end of the exercises, the child is told to "make the rainbow" when he has let go of his "grouchy angries". An illustrated booklet with pictures and carried by the apparatus shows children how to use the device and how to "make the rainbow". Children will enjoy finding the little booklet in the pocket and seeing how other children change from angry to calm. The illustrated booklet will aid in the child's understanding of his ability to change from being angry to calm and/or happy. The apparatus is thus designed to have two interesting designs—one which is receptive to the child's upset feelings and one which is calm and comforting to help the child resolve his upset feelings. Children are then able to convert the apparatus from one design into the other. The conversion mechanism is designed to allow little hands to make the concrete conversion from upset state to calm state all by themselves.

The present invention differs from prior art devices in that the prior art devices do not provide a specific method and apparatus for emotional resolution which incorporates speech technology, soft goods design, and developmental and clinical psychology techniques. Other devices, such as the vocalizing apparatus in Stowell et al. (U.S. Pat. No. 4,318,245), incorporate only speech technology which emits various types of sounds.

The object of the present invention is to provide a method and apparatus for resolving emotional problems. While the present invention incorporates electronic speech, the speech and electronics comprise only one aspect of this invention. The process of pressing switches, listening to the psychological exercises, manipulating the apparatus, and resolving difficult emotions as directed in the exercises are the major objects and advantages of this invention.

Other prior art related to the field of the invention includes the following U.S. Pat. Nos.:
3,376,585 Muzaurieta
3,383,074 Rautiola et al.
3,636,654 Workman
3,934,284 Paletta et al.
4,411,629 Voights
4,651,613 Harrison

SUMMARY OF THE INVENTION

The preferred embodiment of the object-directed emotional resolution apparatus for young children aged two to six uses speech and electronics technology coupled with psychological techniques to further emotional development in children. There are currently in existence devices to stimulate symbolic play, devices to promote intellectual development, devices to develop gross motor skills, devices to practice fine motor coordination, and devices with which to learn to explore, examine, and experiment. However, there are currently no devices specifically designed to stimulate and promote healthy emotional development in children. The area of emotional development is left to the parents who are offered books to read to their children or books written for parental use. Many of these books recommend that parents encourage their children to exercise autonomy. Yet, in the most important area of emotional development, the child is not given tools which are interesting, suitable, or effective for individual use.

Parents are taught to give their children "time-out"—time alone in a quiet place—when they are upset. Time-out is often successful in helping children calm down. However, while time-out gives children the opportunity to quiet down, it offers no concrete assistance in processing or working through the feelings which led to the emotional outburst.

If instead the child can talk to and listen to the apparatus during time-out, then he can calm down and learn on his own how to deal with his feelings. When the parent talks to him afterwards, the child will have had the opportunity of first getting help from a neutral source. Children will start to use the apparatus on their own without getting to the emotional state when parents call for a time-out. The friendly and approachable apparatus will be picked up and used whenever the child desires—an opportunity to exercise autonomy in the area of emotional development. The apparatus will also be helpful in preschool and day care facilities where teachers will find the apparatus a useful addition to their educational toolbox.

The apparatus is designed to help two to six year old children deal with feelings in a constructive manner. The scripts in the apparatus deal specifically with anger. The apparatus is designed to be used when children are upset, encouraging them to express their feelings and defuse them.

The use of the apparatus is designed to accomplish six specific goals:

1. Promote healthy emotional development in preschoolers via a fun, stimulating "talking/singing" electronic device.

2. Accept children's feelings and provide them with a constructive way to express their anger.

3. Offer children an independent, autonomous way to handle their feelings.

4. "Talk", "sing" and "listen" to children according to guided scripts so that they are calmer after playing with the device.

5. Provide parents and teachers with an educational tool to help them facilitate children's emotional development.

6. Offer children specific strategies to deal with anger.

The scripts in the apparatus deal specifically with anger which is very common in preschool age children.

The apparatus combines several innovative features in its design:

1. Soft goods and mechanical designs which allow the apparatus to be turned from one configuration into another and to be played with in both configurations.

2. Omnidirectional squeeze switches custom-designed for ease of use by small hands.

3. Digitized speech which is both natural-sounding and highly intelligible.

4. Software on ROM (Read-Only Memory) to allow switch selection of individual strategies for dealing with emotions.

5. Song with original lyrics and tune for emotional development as well as for the pleasure and enjoyment of preschool-age children.

6. Effective strategies to deal with anger specifically designed, based on developmental and clinical psychology, for independent use by two to six year old children.

The combination of these features results in an apparatus which is effective for emotional development and which has a high degree of play value.

The present invention, therefore, provides an apparatus and method for use by children in resolving emotions and reducing stress using programmed psychological exercises, delivered via synthetic or tape-recorded speech and sound effects, which direct the person to carry out specific actions on or with the apparatus or to listen to specific speech or music from the apparatus and thereby reduce their sense of aggravation, tension, upset or anger.

The apparatus for use by children, is preferably a multi-colored, cloth-covered electronic device for boys and girls in the two to six year old age group. The device allows children to choose different talking or singing scripts by squeezing their choice of omnidirectional switches encased in the soft cloth projections on the apparatus. Each omnidirectional switch is designed for ease of use by preschool-age children who have not achieved complete fine motor coordination. The child can activate the omnidirectional switch by grabbing the projection with his hand and squeezing the shaped cloth projection.

The device can be used in two different configurations:

1. The "angry pillow" with a round, drum-like shape, a soft red pillow to pound on, and attached stuffed shapes to manipulate; and 2. The "rainbow", a multi-colored cloth mound with white, soft cloud shapes attached to the mound.

The device is designed so that children can convert the device from one configuration to the other as the device helps them change their mood from angry to calm. Each of the talking or singing scripts is designed to be simultaneously intriguing and helpful to preschoolers. The electronic components of the object include software speech synthesis, which results in clear, digitized speech stored at a low bit rate, allowing a large amount of speech to be stored on one ROM (Read-Only Memory).

BRIEF DESCRIPTION OF THE DRAWINGS

FIG. 5 is a top plan view of the apparatus when the same is in the second operative configuration;

FIG. 6 is a side elevational view of the apparatus of FIG. 5; and

FIGS. 7, 7a and 7b are front elevation, side and end views of the speech playback device forming a part of the apparatus of the present invention.

DETAILED DESCRIPTION OF THE DRAWINGS

Figure 2:
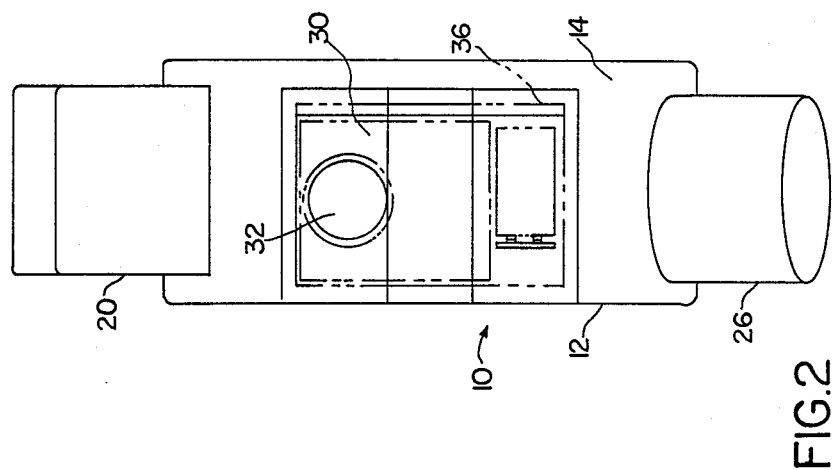
FIG. 2 is a side elevational view of the apparatus of FIG. 1.

The apparatus of the present invention is broadly denoted by the numeral 10 and includes a shell-like body 12 having a generally circular side wall 14 and an end wall 16, the side and end walls being formed from fabric sheet material which is flexible and contains soft stuffing material. Thus, body 12 can be grasped by the hand and struck or pounded by the hand without injury to the hand. The body 12 resembles a pillow except that it is hollow to present a space 18 (FIG. 3) surrounded by side wall 14. One side of the body is open, and the body is sufficiently flexible to permit the body to be turned inside out.

Side wall 14 and end wall 16 are of a desired color or colors, end wall 16, for instance having a center part 16a which is of red and an outer peripheral part 16b of blue. These colors are used to stimulate the interest of children to play with and manipulate apparatus 10. Parts 16a and 16b of end wall 16 may be coupled together and to side wall 14 in any suitable manner, such as by stitching or the like.

Apparatus 10 has a plurality of projections thereon at uniformly spaced locations around the outer periphery of side wall 14. The projections, denoted by the numerals 20, 22, 24, 26 and 28, are made of fabric and, except for projection 28, are filled with a soft stuffing material to allow the projections to be squeezed, pounded or struck by the hand or fist without injury to the hand. The projections are secured in any suitable manner, such as by stitching, to the outer surface of side wall 14, when the apparatus is in a first configuration, namely the "angry pillow" configuration of FIGS. 1-3. Moreover, the projections can have any desired configuration, such as a square configuration, a cylindrical configuration, a triangular configuration or a rectangular configuration. The projections typically extend outwardly a distance of approximately 2 to 3 inches from the outer surface of the side wall 14 when the side wall has a diameter of approximately 12 to 15 inches. The projections can be of other sizes and shapes, if desired.

Projection 28 is hollow and contains an electronics device 30 which is generally rectangular in shape as shown in FIG. 7. Device 30 includes a speaker 32, an on/off switch 34, a battery 36, electronics circuitry 39, and a PC board 38. The electronics circuitry includes pre-recorded scripts, parts of which relate to the pounding, touching or squeezing of any one of projections 20, 22, 24 and 26.

Figure 1:
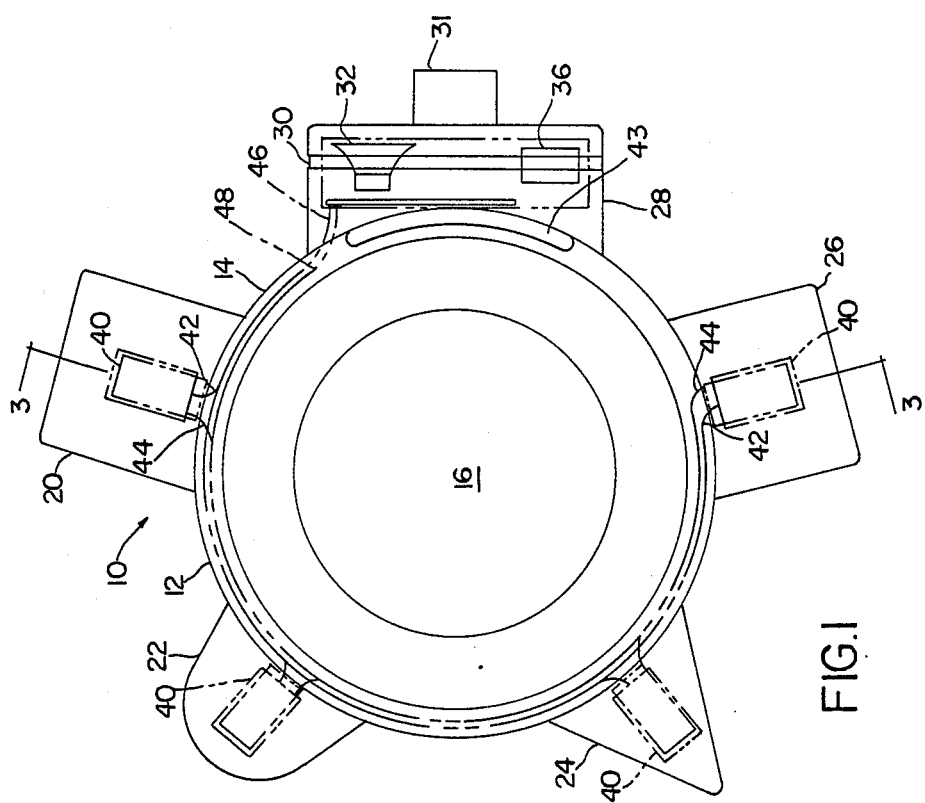
FIG. 1 is a top plan view of a preferred embodiment of the apparatus of the present invention, showing the relative positions of a speech playback device and switches for actuating the speech playback device, the apparatus being in a first operative configuration.

Each of projections 20, 22, 24 and 26 has a switch 40 which is centrally located within the corresponding projection and which can be actuated by squeezing or pounding the corresponding projection with a hand, each switch having a pair of leads 42 and 44 coupled in any suitable manner to leads 46 and 48 connected to device 30 (FIG. 1).

The construction of the switches has been selected so as to be easy for use by children. The switches are omnidirectional in that a child can squeeze the switch in any direction and the switch will be actuated. The size and shape of each switch are selected for use by small hands. The action of the switch is appropriate for children in an age range of 2 to 6 years, who have not yet attained complete motor coordination of the hand. Each switch is designed to be durable, to have a good feel, to be squeezable and cylindrically omnidirectional and to allow it to be squeezed hard.

Each switch has a resilient tube which wraps around an inner core to provide a good squeezing feel and sound. The tube is made of molded plastic to resemble a spool. Typically, there are end spacers around the molded plastic tube. A wire is attached to the inner conductor. A metalized plastic conductor ring encircles the middle portion of the ring. A wire is attached to an outer beryllium copper spring tube. The resilient tube slides over the molded piece and the feel of the switch can be controlled by adjusting the thickness of the material.

An alternate design for a switch is an elastomeric switch composed of a silicone rubber compound. The combination of conductive and nonconductive types of silicone rubber is molded into the appropriate shape for the switch. Contact points are created with a conductive rubber and the form factor element of the switch is comprised of non-conductive silicone rubber. This elastomeric switch design would offer water resistance, a high degree of reliability and a long operating life. The operating life would most likely exceed 500,000 cycles.

PC board 38 has electronic circuitry 37 comprising an Intel 8031 or similar microprocessor, and an EPROM with software synthesis, compressed speech and control program. These and other electronic components are housed in a plastic box. The battery is typically a 9-volt battery to power the electronic circuitry.

The control program is stored on the EPROM with the compressed speech and software synthesis algorithm. The control program connects switch input to individual spoken or sung scripts in apparatus 10.

The scripts stored on the EPROM are developed and edited to a total of two minutes (more or less) of unique speech.

Side wall 14 has a pocket 43 (FIG. 1) for receiving a booklet, such as a child's story book, usable with apparatus 10. The upper end of pocket 43 can be provided with a zipper on the side wall 14, if desired.

Figure 3:
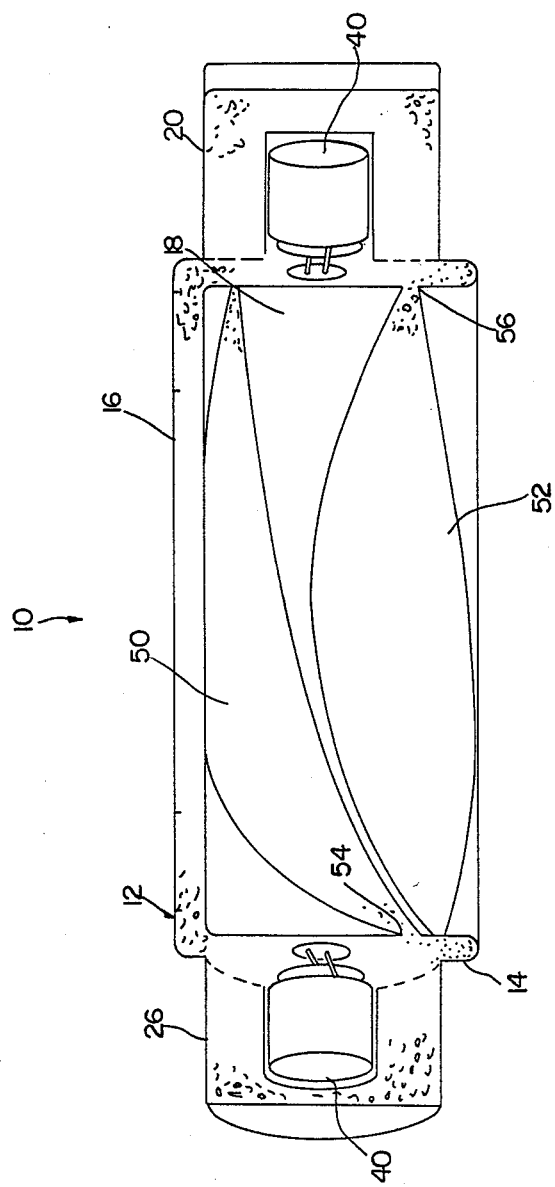
FIG. 3 is a cross-sectional view taken along line 3—3 of FIG. 1.

A pair of pillow-like members 50 and 52 are provided on apparatus 10 and, when projections 20, 22, 24, 26 and 28 are in their "angry pillow" configuration shown in FIG. 1, the pillow-like members 50 and 52 are normally within space 18 surrounded by side wall 14 as shown in FIG. 3. Pillow member 50 is secured, such as by stitching, at a location 54 (FIG. 3), and pillow member 52 is connected at location 56 (FIG. 3) diametrically opposed to location 54.

Figure 4:
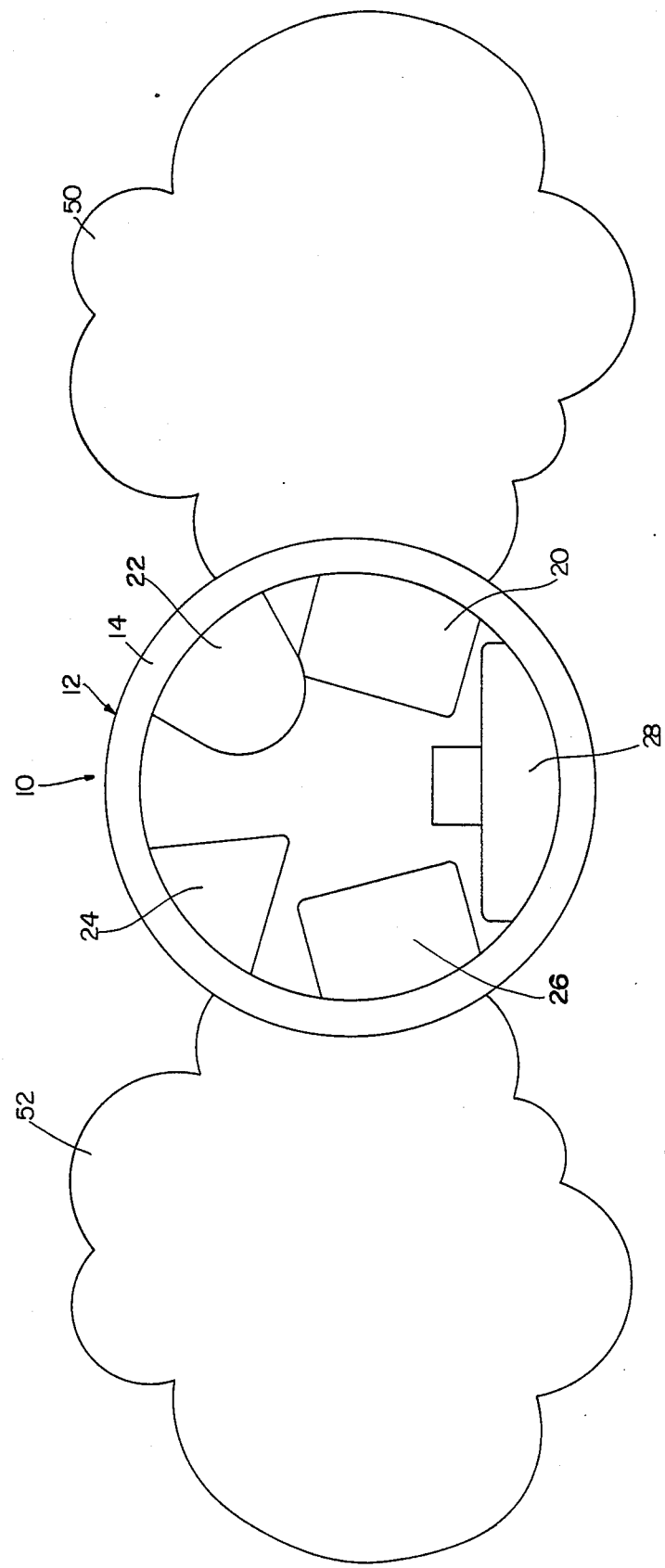
FIG. 4 is a bottom plan view of the apparatus when the projections have been inverted and are within the walls of the body of the apparatus, the apparatus being in its second operative configuration.

Apparatus 10 can be manipulated so that body 12 can be turned inside out. Thus, instead of having projections 20-28 on the outer surface of the side wall 14 to form the "angry pillow" configuration of FIGS. 1-3, pillow members 50 and 52 will be on the outer surface of side wall 14 to place apparatus 10 in a "rainbow" configuration, as shown in FIGS. 4-6. In the "rainbow" configuration, projections 20-28 will be within the body 12 and will extend inwardly toward the center of the body. FIG. 4 further shows that pillow members 50 and 52 are secured to and extend laterally from the side wall 14 in opposed directions when apparatus 10 is in the "rainbow" configuration. The pillow-like members 50 and 52, therefore, simulate fluffy clouds in a sky. To enhance this effect, the outer surface of body 12, is made up of strips of fabric of different colors extending along stitch lines 53 as shown in FIGS. 5 and 6.

In use, the following steps are performed in the object-directed emotional resolution method of the present invention for two to six year old children:

1. With the apparatus 10 in the "angry pillow" configuration, a child turns the apparatus on by actuating the on/off switch 34 of device 30. The child then squeezes a projection and a switch 40 in the projection to choose a particular script if there are multiple scripts. Otherwise, if there is only one script, it starts by turning the apparatus on.

2. The user listens to the playback of the recorded speech and carries out the activities as instructed in the speech. These activities include manipulation of body 12, such as by pounding, moving projections as in the motion of breaking a pencil, listening to a story, song or relaxation exercise, and talking to the apparatus about what is upsetting the child.

3. The child uses the apparatus to resolve upsetting emotions and reduce stress. Each of the activities is a psychological exercise to promote emotional resolution and stress reduction.

In using the apparatus, the child squeezes or presses the on/off switch 34 on the side of device 30 which is held in projection 28 by a zipper (not shown). The child chooses one of the projections 20-26 and squeezes the projection which actuates a switch 40 in that projection. The switch actuates the speech for that knob and the apparatus sings or talks to the child. The child responds to the verbal directions spoken by the apparatus by talking, pounding, singing, or listening. The child finishes with the first script and then chooses another script by squeezing a different projection or chooses to end his "time out" session by inverting the pillow to make the rainbow (FIG. 5).

The child can continue to choose the same or different scripts by squeezing the projections. He can continue as long as he wants until he feels resolved. When he feels complete, he can make the rainbow by inverting the body as described above with respect to FIGS. 4, 5 and 6. As part of the completion of the "time out" session, the child is instructed by apparatus 10 to share the rainbow with the person he was angry with if, in fact, he was angry with a particular person. This helps the child to resolve his feelings with his parents, siblings, friends or teachers. It also provides an opportunity for the parent or teacher to discuss the upsetting condition with the child, if appropriate.

The child turns off the apparatus by deactuating the on/off switch 34. If the child forgets to turn off the switch, the switch can be made so that it will "time out" after two minutes and turn off the power by itself.

The synthetic speech produced by device 30 is based upon the digitized autorecording of the actual voice of a trained psychologist. The digitized signal is typically analyzed and compressed to attain a low bit rate. Prosodic information has been extracted and superimposed so that sounded-like words that differ only in intonation are stored only once. The speech has a bit rate of 5,000 bits/second.

The embodiment of an apparatus for object-directed emotional resolution for children in the range of 5 to 12 years old can be made to operate in the following manner.

1. The child activates the speech playback device by pressing the on/off switch.

2. The child squeezes a projection or part of the apparatus containing a switch to actuate a particular script.

3. The apparatus relates a psychologically-based exercise to the child to help the child resolve his unhappy feelings. After the exercise is completed, the child can choose another exercise by squeezing a different projection or else the child can turn the apparatus off by pressing the on/off switch.

Other embodiments of the apparatus for carrying out the method for object-directed emotional resolution for persons in other age groups, such as pre-teens, teenagers, and adults, would include the shape, form, feel, look, and psychological exercises appropriate to the target age group.

APPENDIX A
References

1. Piaget, J. and Inhelder, B. (1969). *The Psychology of the Child.* New York: Basic Books, Inc.
2. Rogers, C. (1961). *On Becoming A Person.* Boston: Houghton Mifflin Company, pp. 314–317.
3. Skinner, B. F. (1953). *Science and Human Behavior.* New York: The Free Press, pp. 160–170.
4. Bach, G. and Goldberg, H. (1974). *Creative Aggression.* New York: Avon Books, pp. 261–283.
5. Peter, L. and Dana, B. (1982). *The Laughter Prescription.* New York: Ballantine Books, pp. 22–23.
6. Nideffer, R. and Sharpe, R. (1978). *How to Put Anxiety Behind You.* New York: Stein and Day, pp. 70–74 and pp. 123–127.
7. Forbes, R. (1979). *Corporate Stress.* Garden City, New York: Doubleday & Company, Inc., pp. 30–35.
8. Berne, E. (1964). *Games People Play.* New York: Grove Press.
9. Satir, V. (1972). *People Making.* Palo Alto, Calif.: Science and Behavior Books, Inc., pp. 20–29.
10. Damon, W. (1979). *The Social World of the Child.* San Francisco: Jossey-Bass.
11. Gross, A. M. and Wojnilower, D. A. (1984). Self-directed behavior change in children: Is it self-directed? *Behavior Therapy,* Nov, 15, pp. 501–514.
12. Honig, A. S. (1985). Compliance, Control, and Discipline. *Young Children,* Mar, 40, pp. 47–52.
13. Piaget, J. (1965). *The Moral Judgment of the Child.* New York: MacMillan.
14. Turiel, E. (1986). Potential relations between the development of social reasoning and childhood aggression. *Childhood Aggression and Violence: Sources of influence, prevention, and control.* In press.
15. Cahill, A. J. (1981). Aggression revisited: The value of anger in therapy and other close relationships. *Adolescent Psychiatry,* 9, pp. 539–549.
16. Axline, V. M. (1947). *Play Therapy.* New York: Houghton Mifflin.
17. Boswell, J. (1982). Helping children with their anger. *Elementary School Guidance and Counseling.* April 16, pp. 278–287.
18. McCandless, B. R. and Trotter, R. J. (1977). *Children: Behavior and Development.* New York: Holt, Rinehart, and Winston.
19. Schaeffer, C. E. and Millman, H. L. (1981). *How to Help Children with Common Problems.* New York: Plume.
20. Kopp, C. B. (1982). Antecedents of self-regulation: A developmental perspective. *Child Development,* 18, pp. 199–214.
21. Miller, C. S. (1984) Building self-control: Discipline for very young children. *Young Children,* Nov, 40, pp. 15–19.
22. Jones, T. D. (1939). *The Development of Certain Motor Skills and Play Activities in Young Children.* New York: Teachers College Press.
23. Oppenheim, J. F. (1984). *Kids and Play.* New York: Ballantine.
24. Dobson, J. (1986). *The Strong-Willed Child.* Wheaton, Ill.: Tyndale Press.
25. Briggs, C. D. (1975). *Your Child's Self-Esteem.* Garden City, N.Y.: Doubleday and Company.

I claim:

1. A method for resolving emotional problems and reducing stress with the use of a manipulable object comprising:
    providing at least one recorded script with each script including instructions about carrying out a respective psychological exercise, manipulating the object to select one of said scripts and thereby a respective psychological exercise to be performed by the user;
    listening to the selected script for the instructions associated with the respective psychological exercise; and
    carrying out the instructions using the object as instructed by the selected script to thereby resolve the emotional problems of the user and reduce the stress of the user.

2. A method as set forth in claim 1, wherein said manipulating step includes touching the object at any one of a number of locations thereon with each location corresponding to a predetermined psychological exercise.

3. A method as set forth in claim 1, wherein said manipulating step includes striking the object at any one of a number of locations thereon with each location corresponding to a predetermined psychological exercise.

4. A method as set forth in claim 1, wherein said manipulating step includes squeezing the object at any one of a number of locations thereon with each location corresponding to a predetermined psychological exercise.

5. A method as set forth in claim 1, wherein said manipulating step includes actuating a switch at any one of a number of locations on the object with each location corresponding to a predetermined psychological exercise.

6. A method as set forth in claim 1, wherein said manipulating step includes actuating an electronic device having a recorded script for each of said psychological exercises, respectively.

7. A method as set forth in claim 1, wherein said step of carrying out the instructions includes changing the configuration of the object.

8. A method as set forth in claim 7, wherein said changing step includes turning the object inside out to change from a first configuration to a second configuration.

9. A method as set forth in claim 1, wherein is included the step of selecting a second psychological exercise by manipulating the object after a first selected psychological exercise has been selected and the instructions thereof have been carried out.

10. A method as set forth in claim 1, wherein is included the step of repeating the manipulating, listening and carrying out steps for a second psychological exercise after such steps for a first psychological exercise have been performed.

11. A method as set forth in claim 10, wherein said step of carrying out the instructions includes changing the configuration of the object.

12. A method as set forth in claim 11, wherein said changing step includes turning the object inside out to change from a first configuration to a second configuration.

13. Apparatus for use in resolving emotional problems and reducing stress comprising:
a body having at least one manipulable projection extending outwardly, each projection including a switch, each switch being actuatable when the projection is manipulated;
a device carried by the body and having electronic circuitry defining at least one recorded script, there being a script for each switch, respectively, each script having instructions for carrying out a respective psychological exercise whereby a particular exercise may be selected by the user and the user can carry out a psychological exercise as instructed by the respective script.

14. Apparatus as set forth in claim 13, wherein said body is shell-like and is formed of fabric material.

15. Apparatus as set forth in claim 13, wherein said body is formed of fabric material, said projections being stitched to the side wall at spaced locations thereon.

16. Apparatus as set forth in claim 13, wherein said body has a side wall, the side wall being generally cylindrical, said projections being at circumferentially spaced locations on the side wall.

17. Apparatus as set forth in claim 16, wherein said side wall has a pocket for receiving and holding said device.

18. Apparatus as set forth in claim 13, wherein said body has an end wall at one end of the side wall, the body being open at the opposite end of the side wall, said body being capable of being turned inside out to change from a first configuration to a second configuration.

19. Apparatus as set forth in claim 18, wherein the projections extend outwardly from the side wall when the body is in a first configuration and the projections extend inwardly from the side wall when the body is in a second configuration.

20. Apparatus as set forth in claim 19, wherein is included a pair of pillow-like members secured to the side wall at diametrically opposed locations thereon, said members being within the body when the body is in said first configuration and being exteriorly of the side wall when the body is in the second configuration.

21. Apparatus as set forth in claim 20, wherein the outer surface of the body when the body is in the second configuration is comprised of multicolored stripes which contrast with the color of the members to present a rainbow effect.

22. Apparatus as set forth in claim 13, wherein the scripts are recorded in an electronic memory of said device.

* * * * *